(No Model.) 7 Sheets—Sheet 1.

T. L. SMITH & W. S. DOIG.
BOX NAILING MACHINE.

No. 342,268. Patented May 18, 1886.

Witnesses:
Gabriel J. W. Galster
Robert Wood

Inventors
Thomas L. Smith
William S. Doig
their attorney
W. Colborne Brookes (No Model.) 7 Sheets—Sheet 4.

T. L. SMITH & W. S. DOIG.
BOX NAILING MACHINE.

No. 342,268. Patented May 18, 1886.

Witnesses
Gabriel J. W. Galster.
Robert Wood.

Inventors
Thomas L. Smith
William S. Doig
by their attorney W. Colborn Brookes (No Model.) 7 Sheets—Sheet 6.

T. L. SMITH & W. S. DOIG.
BOX NAILING MACHINE.

No. 342,268. Patented May 18, 1886.

Witnesses:
Gabriel J. W. Galster
Robert Wood

Inventors
Thomas L. Smith
William S. Doig
by their attorney
W. Colborne Brookes

UNITED STATES PATENT OFFICE.

THOMAS L. SMITH AND WILLIAM S. DOIG, OF BROOKLYN, NEW YORK; SAID SMITH ASSIGNOR TO SAID DOIG.

BOX-NAILING MACHINE.

SPECIFICATION forming part of Letters Patent No. 342,268, dated May 18, 1886.

Application filed August 8, 1884. Serial No. 140,056. (No model.)

*To all whom it may concern:*

Be it known that we, THOMAS L. SMITH and WILLIAM S. DOIG, citizens of the United States, both residing at Brooklyn, in the county of Kings and State of New York, have jointly invented certain new and useful Improvements in Box-Nailing Machines, of which the following is a specification.

Our invention relates to improvements in box-nailing machines, and it has reference, first, to the nail receiving and distributing device, and, secondly, to the nail conducting and driving mechanism, which is of the description shown and described in the application for Letters Patent of the United States filed by us on or about the 14th day of January, 1884, Serial No. 117,556, the nature of which will be fully explained by reference to the accompanying specification and the drawings annexed, which form part of the same.

Referring to the drawings, Fig. 2 is a side view of the same. Fig. 2$^a$ is a detail view of the clutch-releasing device. Figs. 4 to 37 represent detail views of the various parts.

In each of the views similar letters of reference are employed to indicate corresponding parts in all the figures wherever they occur, and the several parts embraced in the application before referred to are marked with similar letters of reference.

A A represent the main framing and A' the base or bed plate.

B is the main or driving shaft, which is supported in bearings $a\ a$, carried by brackets or standards $a'\ a'$, bolted to the base or bed plate A'. Motion is communicated to the main shaft B by means of a driving-pulley, B', which runs freely on the main shaft B, except when connected thereto by the clutch C, and which we prefer to be of the description known as "Frisbie's Clutch," which is operated by a series of levers, $c\ c'\ c^2$, operated by preference by a treadle-lever, $c^3$, arranged in position to be actuated by the foot of the operator when it is desired to connect the driving-pulley B' with the shaft B, to put the machine in operation. The clutch C is thrown out of operation at the desired times automatically by the machine, as hereinafter explained.

O is the nail-supply pan, which is by preference of a rectangular form, and at its front is provided at each side with pivots $o$, carried by brackets $o'\ o'$, by preference forming part of the front plate, O*, of the pan. The pivots $o$ rest in bearings $p'$, carried by the main framing $p$ of the nail-feeding mechanism P, hereinafter more fully described, and which is adapted to supply the nails in regulated quantities and order, as may be desired.

In the bottom of the nail-supply pan are formed a series of channels, $o^2$, the width of which is adjustable from time to time, in order to accommodate the device to nails of various sizes. The width of the channels $o^2\ o^2$ is controlled by adjusting the position of one of each of the pair of plates $o^3\ o^4$, forming the channels $o^2$, for the guidance of the nails to the nail-feeding mechanism for the accommodation of a nail of a given size, and also for the purpose of making the channels $o^2\ o^2$ register with the channels or nailways P$^2$ of the feeding mechanism P. The plates $o^3$ are held in position by screws $o^*\ o^{**}$, and are adjustable laterally, so as to allow of their being drawn nearer to or farther from the plates $o^4$, so as to allow of a wider or narrower channel between the plates $o^3\ o^4$, in order to accommodate a nail of any given size. On their upper sides the plates $o^3\ o^4$ are provided with surface plates, $o^5$, which are firmly secured to the plate $o^4$ by means of screws $o^{11}$, and are at their rear ends provided with separate curved or angular extensions $o^6$, extending out to the part $o^7$ of the nail-feeder pan in which the nails are first placed by the attendant. The curved extensions $o^6$ are formed, by preference, of cast-iron, and should be of slightly greater thickness than the plates $o^5$, in order to present a greater extent of surface to their curved parts, in order to facilitate the guidance of the nails into the nailways, and they are formed adjustable, in order that they may be removed and their curved surfaces ground and adjusted when worn or become roughened by the action of the nails in passage, or other curved extensions, $o^6$, of greater width, supplied in the event of the old ones becoming too narrow owing to wear and regrinding. The nails having been placed in the part $o^7$, they will be automatically shaken up and distributed into the channels $o^2$ by the action of the cord or chain $o^8$, one end of which is, by means of a hook, $o^9$, connected with the rear end of the nail-supply pan O. The cord or chain $o^8$ passes up over a pulley, $o^{10}$, and is carried down and connected to a hook, $q$, formed on the end of a lever, $q'$, which, at $q^2$, is pivoted to a lever, $q^3$, bracketed to a chain-wheel pulley, $q^4$, carried by a bracket, $a^5$, bolted to a casting, $a^6$, carried by the rear bracket or standard, $a'$. The curved or angular extensions $o^6$ serve to guide the nails automatically into the channels $o^2$ $o^2$, and insure their being dropped into a pendent position, ready to be discharged from the channels $o^2$ and carried down the nailways $p^2$, formed between the pairs of plates P' P² constituting the nailways $p^2$. The series of plates P' are bolted or connected to a rectangular frame, P⁴, which is held rigidly in position laterally by means of extensions P⁸, forming part of the rear bar of the said frame P⁴. The extensions P⁸ are pivoted in brackets $p^3$ $p^4$, formed on or affixed to the framing $p$. The series of plates P² are bolted or connected to a rectangular frame, P⁵, the front and rear bars, $p^5 p^6$, of which rest against and slide upon the front and rear bars of the frame P⁴. The frame P⁵ and its plates P² are retained in position laterally by means of adjusting-screws P⁶ P⁷, tapped into lugs $p^7$, formed on the faces of the end pieces of the frame P⁵. The front ends of the screws P⁶ P⁷ bear against the end portions of the frame P⁴, as shown more clearly by Fig. 11. By slackening or withdrawing one or other of the set-screws P⁶ P⁷, and forcing up the opposite one of the said pair of adjusting-screws P⁶ P⁷, the width of the nailways $p^2$ will be regulated to accommodate any size or grade of nail. The plates $o^3$ and $o^4$ of the nail-supply pan O are formed of sufficient length that they shall extend beyond the center of the pivots $o$, and the plates P' P² of the nail-feeder P are also formed sufficiently long that the respective ends of the plates $o^3$ $o^4$ and P' and P² shall overlap each other at or about the line of the center of the pivots $o$ when the nail-supply pan is raised, in order that a correct delivery of the nails from the ways of the pan O to the ways of the feeder P shall be insured. The extent to which the plates $o^3$ and $o^4$ overlap the plates P' and P² may be increased, if desired. In the event of too many nails accidentally passing the weighted bar R, and the channels $p^2$ $p^2$ becoming so clogged that the nails held therein shall extend backward sufficiently to come under the plates $o^3$ $o^4$, the pivots $o$ will rise, so as to accommodate the said accumulation and avoid the fracture of the said pivots $o$ $o$, or the plates of the pan O, or the plates of the nail-feeder P.

Figures 2, 2A:
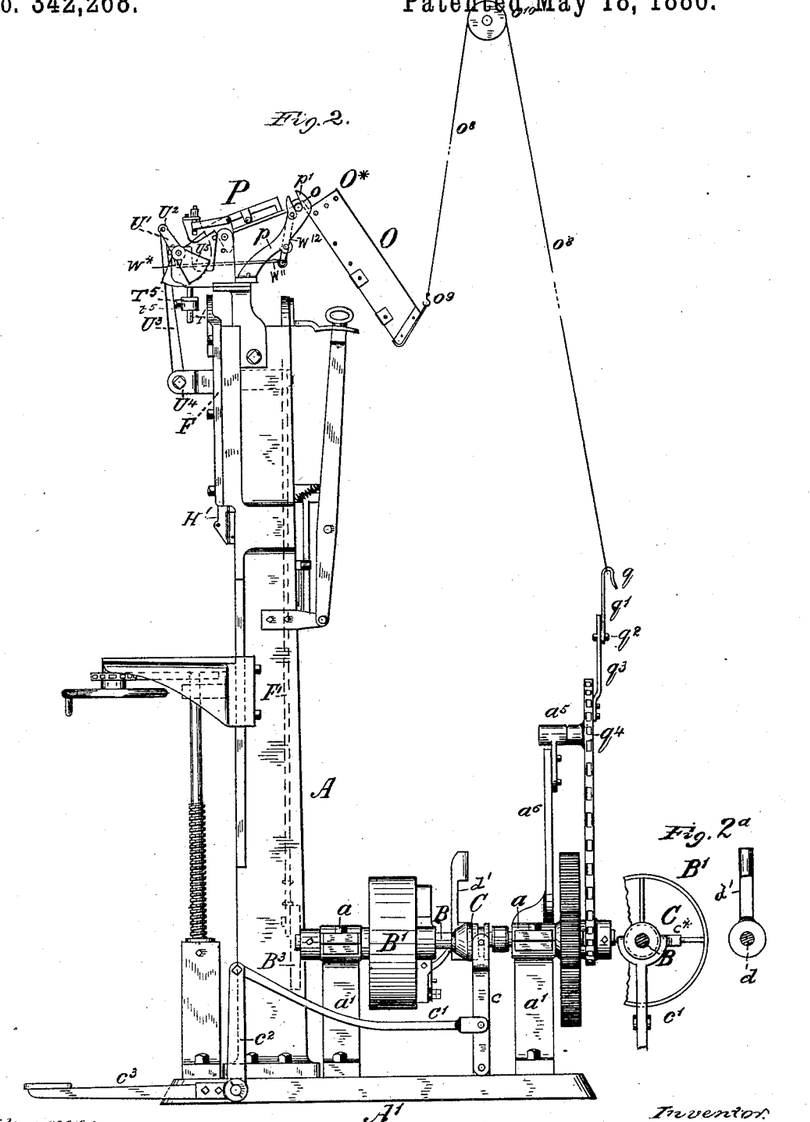

As a guard against any nail being improperly delivered from the nail-supply pan O to the feeder P, we employ a weighted bar, R, supported on bearings $r$, mounted on axes $r'$, and provided on the under side with passageways $r^2$, for the heads of the nails when the same are in proper position for passage to the feeding mechanism; but in the event of any one or more of the nails being out of position, the weighted bar R will, when the pan O is dropped into the position shown by Fig. 2, throw such nail or nails backward and prevent the clogging up of the nail-channels. The weighted bar R is formed with passage-ways $r^2$, the front end of each of which is provided with slight extensions $r^3$, adapted to fall into the grooves or channels $o^2$ $o^2$, so as to prevent the wedging of the weighted bar R in the event of a nail or nails being supplied in an improper position. After the nails have passed down the nailways $p^2$ they are arrested by a stop, S, which is pivoted at $s$ to a block, $s'$, which is supported with capability of adjustment on a bar, $s^2$, with capability of supplementary or alternate attachment to a bar, $s^4$. There are a series of blocks, $s'$, and stops S, one of each for each nailway. The blocks $s'$ are formed with grooves $s^3$, adapted to fit upon the bar $s^2$, and are by preference retained thereon by means of flush plates $s^5$, secured by screws $s^6$. We can, however, if desired, form the blocks $s'$ and the plates $s^5$ in one piece by casting or otherwise. The blocks $s'$, with their stops S, are held in position to operate individually with either one of the nailways $p^2$, by means of removable pins or screws $s^7$, which are capable of being applied so as to connect the blocks $s'$ at will, either with the bar $s^2$ or the bar $s^4$. When the screws or pins $s^7$ are applied in the position shown by dotted lines in Figs. 14 and 15, the blocks will be connected with the bar $s^4$; but when the said pins or screws are applied in the position shown by full lines in Figs. 14 and 15 the said blocks will be connected with the bar $s^2$.

In operating the machine some of the blocks may be connected to the bar $s^2$, while the others are connected to the bar $s^4$, the effect of which will be to produce a variation in the position of the respective nails as delivered by the nail-boxes H' in position to be driven in by the punches I, as hereinafter more fully explained.

To the bar $s^2$ is bolted a pair of bearing-pieces, $s^8$ $s^9$, which are provided with bearings for the reception of the bar $s^4$. The bars $s^2$ and $s^4$ are supported in sockets formed in brackets $s^{10}$ $s^{11}$, bolted or otherwise connected to the extensions P⁸ of the frame P⁴. On the side of the bracket $s^{10}$ is mounted a spring or series of springs, $s^{12}$, adapted to bear against the end of the bar $s^2$, while to the bracket $s^{11}$ is connected a spring or series of springs, $s^{13}$, adapted to bear against the opposite end of the bar $s^4$.

In putting the machine together care must be taken that the spring or springs $s^{12}$ are of greater power than the spring or springs $s^{13}$, so that the tendency will always be to keep the bar $s^2$ in the direction of the arrow 1. The bar $s^2$ is prevented from being forced too far outward by the bearing-piece $s^9$ coming in contact with the bracket $s^{11}$, while the bar $s^4$ is controlled in its outward movement by means of a pin, $s^{14}$, which bears against the bearing-piece $s^8$, sufficient space being left between the bearing-piece $s^8$, and the bracket $s^{10}$ to allow of the necessary traverse of the bars $s^2$ and $s^4$, when desired, and for the purpose, as hereinafter more fully explained, of allowing of the action of the bar $s^2$ independently of the bar $s^4$. At its upper end each stop S is provided with an arm, $s^{15}$, arranged, by preference, at right angles to the said stops. Beneath each of the arms $s^{15}$ is arranged a coiled or other suitable spring, $s^{16}$, which bears against the upper surface of an extension, $s^{17}$, formed on the face of the block $s'$.

Figures 3, 19, 20, 21, 22, 23, 24, 25, 26, 27:
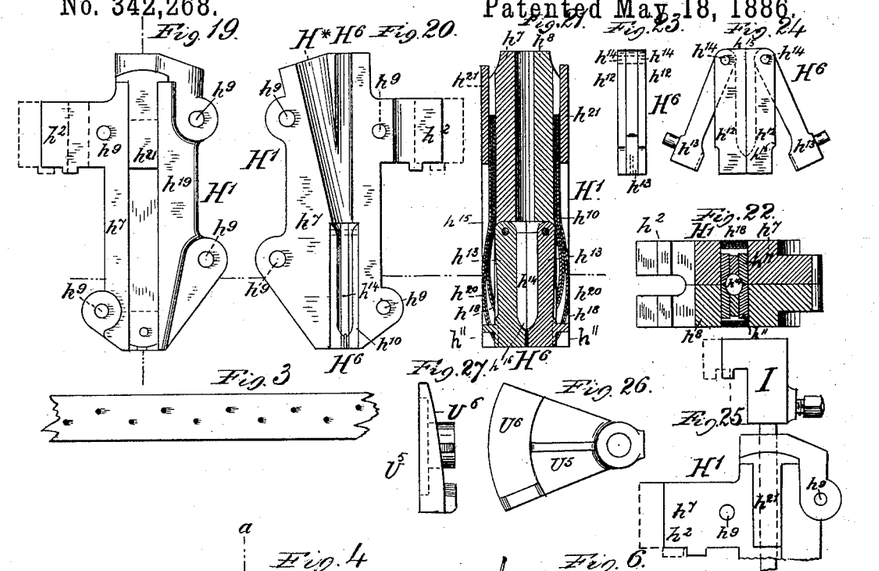
Fig. 3 is a diagram representing a modification of the arrangement of the insertion of the nails which it is frequently necessary to employ.
Figure 7:
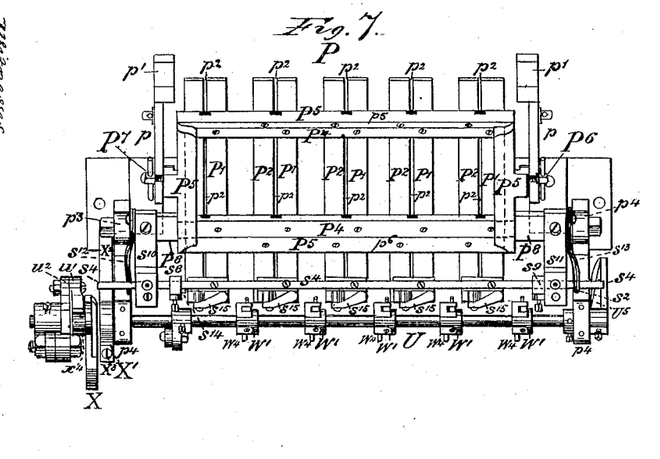
Figure 8:
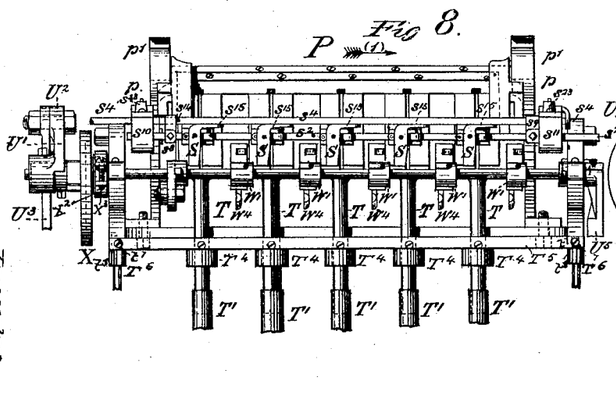
Figure 9:
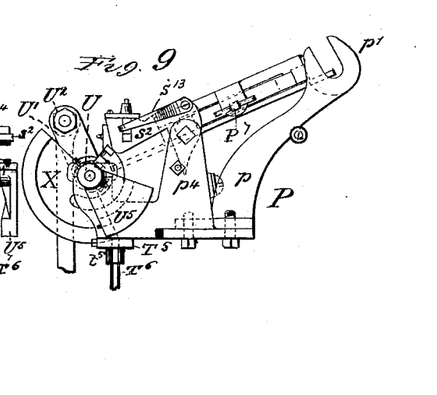
Figure 10:
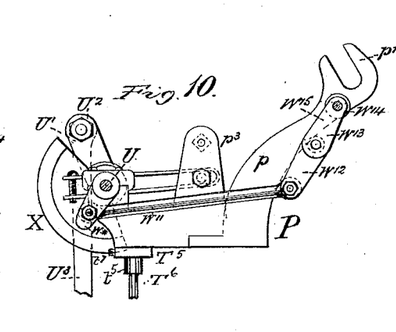

Upon the rear of each of the stops S is formed a projection, $s^{18}$, adapted to bear against the under side of the extension $s^{17}$, so as to counteract the pressure of the spring $s^{16}$, and hold the stops S correctly in a vertical position in front of the nailways $p^2$. The stops S on their sides which face the nailways $p^2$ are curved, as shown at $s^{19}$, Figs. 31, 32, so as to form hooks or projections $s^{20}$, adapted to engage with the head of each nail in succession as it passes down the nailways $p^2$, and hold the same in position to be discharged into the receivers T, by means of which the said nails are conducted to the feed-pipes T', and thence into the funnel H* of the nail-box H', in position to be forced into the top, side, or other portion of a box by means of a punch, I, which at the proper time is forced down through the punchway $H^6$, in the nail-box H'. We can employ any number of nail-boxes H', the number varying according to the size of the nails for the time being used and the number of nails to be driven at any given time by the machine. The nail-boxes H' are formed on their rear faces with extensions $h^2$, which may be of different lengths, as indicated by Figs. 19, 20, and 25, either arranged alternately or otherwise, for the purpose of varying the position of the nails driven, as hereinafter more fully explained. The extensions $h^2$ on their under sides are formed with projections $h^8$, adapted to rest in the upper portion of an inverted T-groove extending across the upper surface of an extension formed on the front face of the nail-box frame H, which is fully described and shown in the specification and drawings of our previous application, Serial No. 117,556.

The nail-boxes are held in position in a similar manner to that described in the application No. 117,566, before referred to.

When it is desired to simultaneously insert nails into a box in positions at different distances apart, both laterally and horizontally, or, in other words, so as to cause two or other number of rows of nails to be inserted as indicated by the diagram, Fig. 3, the nail-boxes H' will be placed in position in the order desired—the nail-boxes to make the first row having short extensions $h^2$, as indicated by full lines in Figs. 19, 20, and 25, while those to make the second row will be provided with long extensions $h^2$, as represented by dotted lines in Figs. 19, 20, 25.

The nail-boxes H' are formed, by preference, as shown by the drawings, in two halves, $h^7 h^8$, secured together by bolts or screws $h^9$. The lower portion of each half $h^7 h^8$ of the nail-box H' is cut away at $h^{10}$, so as to form a recess for the reception of one-half of a nail-clamp, $H^6$. The two halves are shown together, but detached from the rest of the nail-box at Figs. 23 and 24. Each half $h^{11}$ of the nail clamp $H^6$ is formed of two external plates, $h^{12} h^{12}$, between which is arranged a pivoted plate, $h^{13}$, the plates $h^{12} h^{12}$ being connected together by rivets $h^{14}$, which also form bearings for the pivoted plates $h^{13}$. The plates $h^{12} h^{12}$ and $h^{13}$ are so formed that when the two halves $h^7 h^8$ of the nail-clamps are in a closed position, as shown by Figs. 20 and 21, they shall present an oval cavity, $h^{14}$, having a flaring or bell-shaped mouth, $h^{15}$, and a tapering bottom, $h^{16}$, adapted to receive and retain for the moment a nail from a receiver, T, and pipe T', through the funnel H* of a nail-box, H'. After a nail has dropped into the cavity $h^{14}$ the punch I immediately descends, and the shank of the nail is forced down between the lower ends of the plates $h^{13}$, thereby causing them to separate and form a passage for the shank of the nail. When the shank of the nail has been forced down, the head of the same will come against the tapering bottom $h^{16}$, the effect of which is to cause the two halves of the nail-clamp $H^6$ to be forced outward, so as to allow of the passage of the head of the nail being driven. The halves $h^{11}$, as will be seen, are each formed with curved shoulders at their outer upper ends, so as to allow of their pivoting outward on the said shoulders. The halves $h^{11}$ are held in position in their sockets by means of pins or studs $h^{17}$, attached to the plates $h^{13}$, and which are received in the ends of a pair of flat springs, $h^{18}$, secured at their upper ends in grooves $h^{19}$, formed in the halves $h^7 h^8$ of the casting of the nail-box H'. Beneath the springs $h^{18}$ are arranged another pair or series of springs, $h^{20}$, which are shorter and bear only upon the plates $h^{12}$ of the halves $h^{11}$.

The springs $h^{18}$ and $h^{20}$ in the arrangement shown are retained in position by means of wedges $h^{21}$, firmly wedged in above the upper ends of the said springs and between the inner edges of the grooves $h^{19}$. The lower ends of the springs $h^{18}$ are so formed, and are of such length, that they shall allow of the forcing outward of the lower ends of the plates $h^{13}$, while at the same time the halves $h^{11}$ are held in position by the springs $h^{20}$ until the moment the lower ends of the said halves $h^{11}$ are thrust outward by the head of the nail, when the two sets of springs $h^{18}$ and $h^{20}$ will act simultaneously on the plates $h^{12}$, forcing the halves $h^{11}$, and also on the plates $h^{13}$, the object of this peculiar arrangement and construction of the plates $h^{12}$ $h^{13}$ and the springs being to insure the different nails being correctly driven into position by the punches I, and, when the punches I have effected their stroke of the parts, automatically reassuming the positions, (indicated by Figs. 21 and 22,) ready for the reception and conduct of another nail.

U is a shaft mounted in bearings formed in brackets $p^4$, formed on or affixed to the frame $p$. Upon one end of the shaft U is mounted a short lever, U′, to the outer end of which is pivoted the upper end, $U^2$, of a connecting-rod, $U^3$, the lower end of which is pivoted to a bracket, $U^4$, formed on or affixed to the cross-head F, which receives a vertical reciprocating motion from the main shaft B, by means of an eccentric, $B^3$, and connecting-rod F′, constructed and arranged in a similar manner to that described in our application No. 117,566, before referred to.

Upon the shaft U at intervals is mounted a series of cam devices, W, similar in operation to the cam devices described in Letters Patent granted to us bearing date the 1st day of May, 1883, and numbered 276,639. The cam devices W each consist of a boss, W′, which is secured to the shaft U by set screws $W^2$, or other suitable retaining means. Upon the upper side of the bosses W′ is formed a bracket, $W^3$, in which is formed the bearing for the rear end of a curved cam, $W^4$, which is pivoted on a vertical pin, $W^5$, with capability of swinging back laterally on its pin $W^5$ in the event of a nail coming in improper position in relation to the front end of the pointer $W^6$, as hereinafter explained.

To the under side of the forward ends of each of the plates P′ is bolted or otherwise secured a casting, Z, formed with a bearing, $z$, for a pointer, $W^6$, which consists of a metallic rod having a tapering point at one end, adapted to come between the first and second nail in the ways $p^2$, and allow of only the first nail passing to the space between it and the stop S, and at the other end a knob or head, $W^8$, adapted to be borne against by a spring, $W^9$, for the purpose of keeping the said head $W^8$ constantly bearing against the inner face, $W^{10}$, of its cam $W^4$, each cam $W^4$ being provided with a spring, $W^{11}$, adapted to keep the same bearing against its pointer-head $W^8$.

Figures 11, 12, 13, 14, 15, 16, 17, 18:
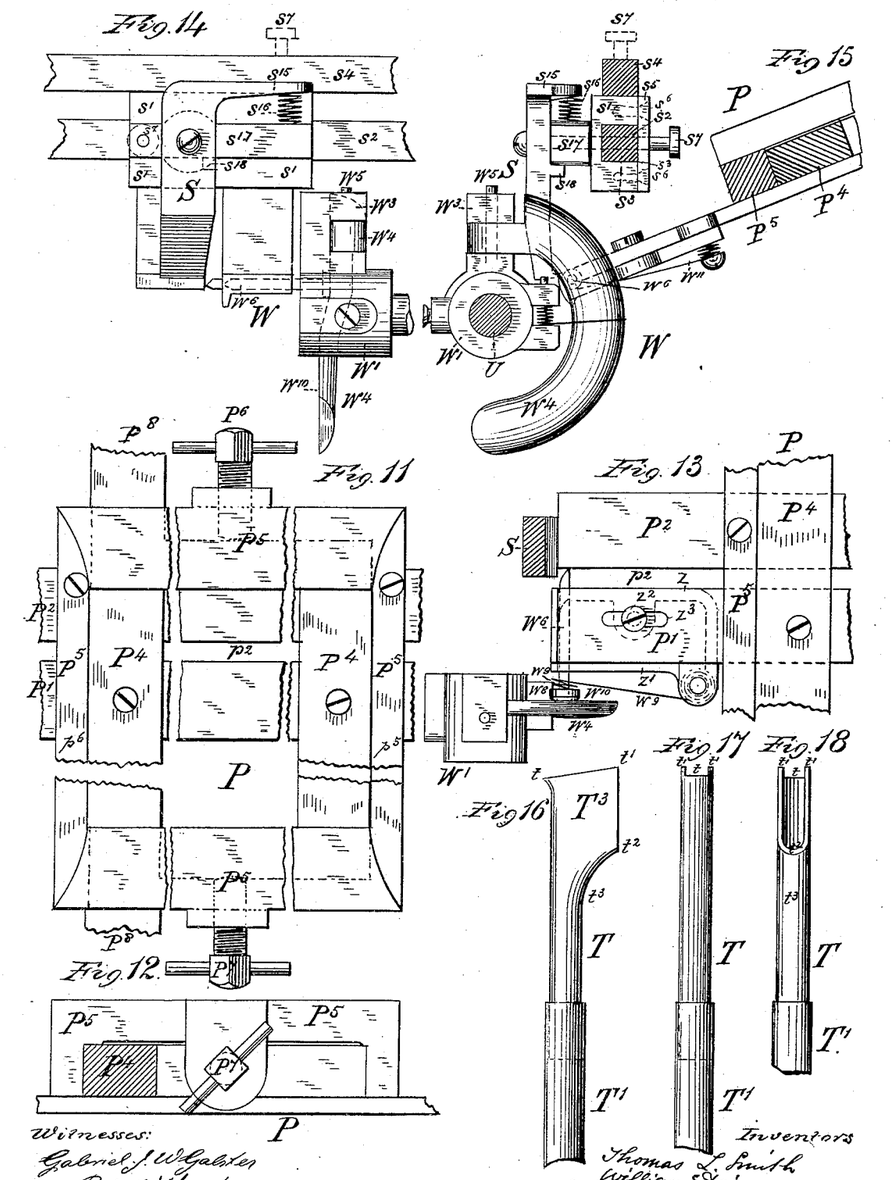
Figures 13A, 31, 32, 33, 34:
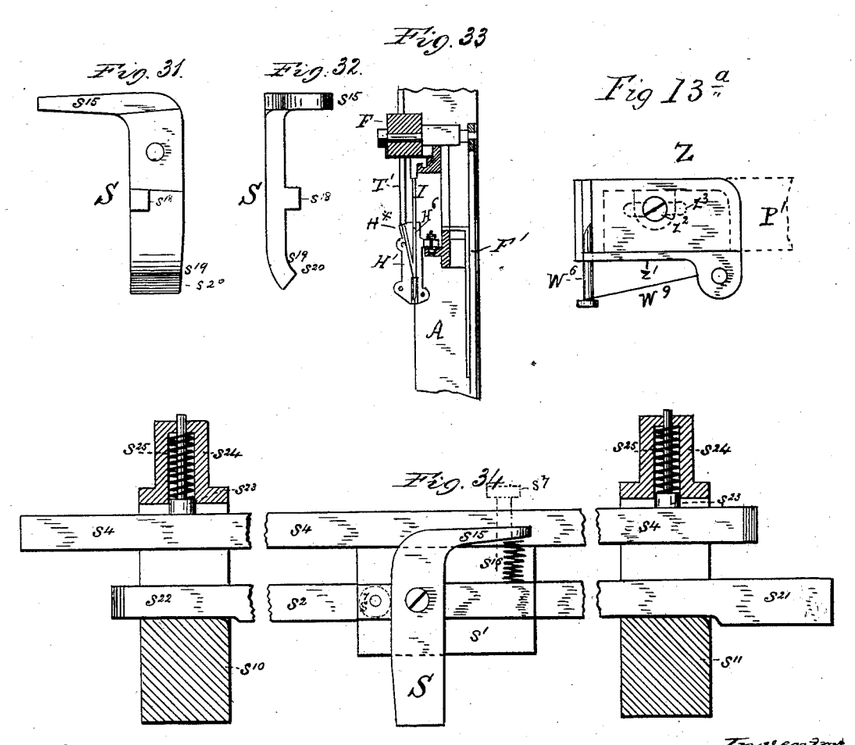

The casting Z is shown separately by Fig. $13^a$. The casting Z is adjustable beneath the plates P′ to and from the stops S, for the purpose of accommodating the shanks of nails of larger or smaller diameter. The casting Z is formed with a flange, $z'$, adapted to rest against the outer edge of the plate P′, and it is adjusted in position by a screw, $z^2$, passing through the plate P′, as shown by Figs. 13 and $13^a$, and adjustable in a slot, $z^3$, in the said plate P′. The cams are oscillated backward and forward by the shaft U at each respective movement of the cross-head F.

Figure 37:
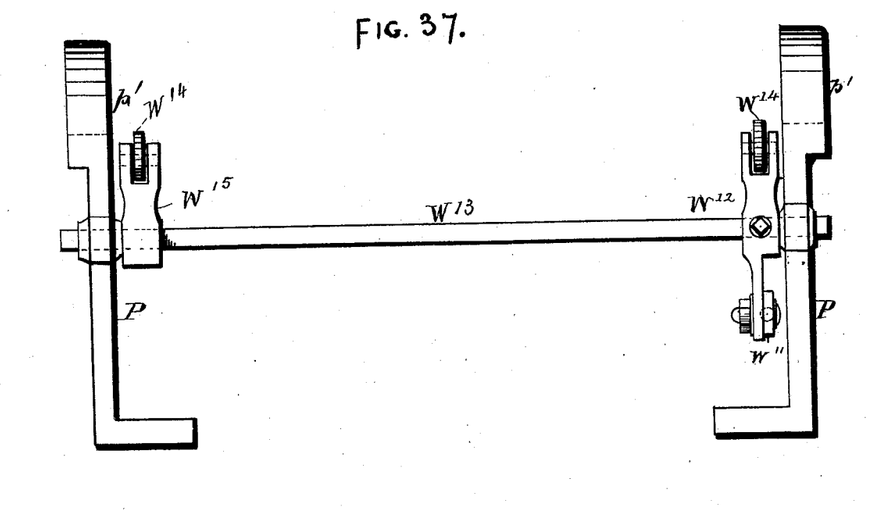

W* is a short arm bolted to the shaft U, to the lower end of which arm is pivoted one end of a lever, $w^{11}$, the opposite end of which arm is pivoted to the lower arm of a double lever, $W^{12}$, mounted on a shaft, $W^{13}$, (see enlarged view, Fig. 37,) the upper arm of which is provided with a friction-pulley, $W^{14}$, adapted to engage with the under side of one of the plates of the feeding mechanism P, for the purpose of rocking the frames $P^4$ $P^5$ every time it is desired to feed a nail. A second lever, $W^{15}$, and which is only a single lever, is also mounted on the shaft $W^{13}$ in position to come under one of the plates of the feeding mechanism P, by preference at an equal distance from the center of the device. The levers $W^{15}$ and $W^{12}$ are fixed on the shaft in such manner that their centers shall exactly coincide. The levers $W^{12}$ and $W^{15}$ are both provided with friction-pulleys $W^{14}$, of equal diameter and at equal distances from the center of the shaft $W^{13}$, for the purpose of keeping the frames $P^4$ $P^5$ true and avoid undue friction on the parts thereof. The motion of the levers $W^{12}$ and $W^{15}$ backward and forward causes the outer end of the feeding mechanism P to be raised and lowered alternately every time a nail is fed through the device, in order to facilitate its passage.

Figure 1:
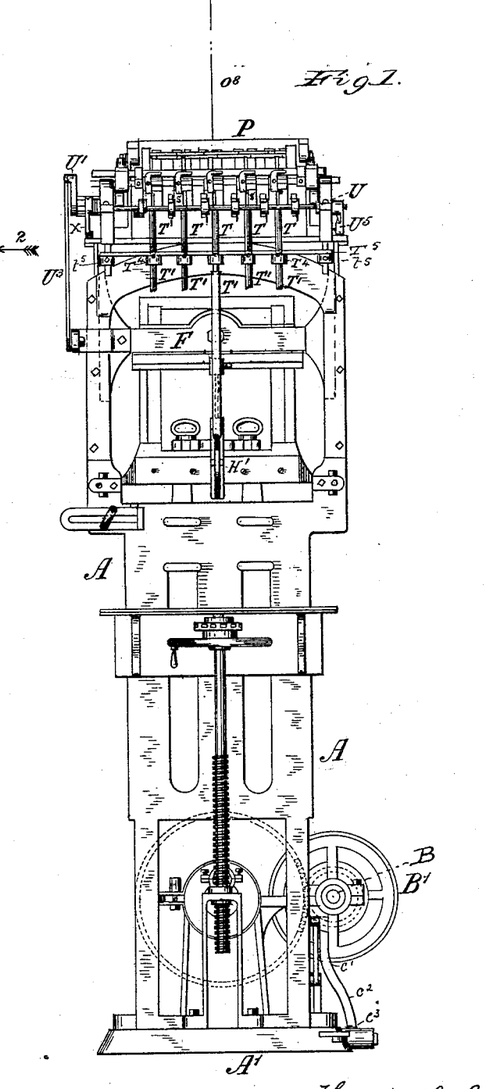
Figure 1 is a front view of our improved machine complete.

Upon the end of the shaft U opposite to that on which is mounted the lever U′ is affixed a cam, $U^5$, which, as shown more clearly by the views, Figs. 26 and 27, is formed with an inclined surface, $U^6$, adapted to come against the end of the bar $s^2$ at each reciprocation of the shaft U, and force the same in the direction of the arrow 2 in Fig. 1, carrying with it the bar $s^4$, (unless said bar is held stationary, as hereinafter described,) and also such of the blocks $s'$ and stops S as may be desired, a sufficient distance to take such stops sufficiently in the direction of the arrow 2, to allow of the passage of a nail from the desired number of nailways $p^2$, and delivering the same to their respective receivers T, to be conducted to the nail-boxes H′, for insertion into the box or device being constructed. The bar $s^2$, as shown by Fig. 34, is formed with an enlarged portion, $s^{21}$, at one end adapted when the said bar is forced in the direction of the arrow 2, Fig. 1, to cause that end of the bar to rise in its bearing in the bracket $s^{11}$, while at its opposite end the bar $s^2$ is formed with a depression, $s^{22}$, on its lower side, the upper side of its bearing in the bracket $s^{10}$ being correspondingly higher, so that the main portion of the bar $s^2$ will serve the same purpose as the enlarged portion $s^{21}$, and cause a corresponding rise of its end of the bar $s^2$. The bars $s^2$ and $s^4$ are held down at all times in their bearings in the respective brackets, $s^{10}$ $s^{11}$, by means of bearing-pieces $s^{23}$, working in guides $s^{24}$, bolted on the upper sides of the brackets $s^{10}$ $s^{11}$, and controlled downwardly by spiral or other suitable springs, $s^{25}$. (Shown clearly in Fig. 34.) The object of the said rise of the bars $s^2$ $s^4$ is to cause the hook $s^{20}$, on the lower ends of the stops S, to tilt the heads of the nails backward, so as to tilt the ends of their shanks forward from the receivers T, and insure their proper delivery to the tubes of the receivers T. The cam $U^5$ is timed to press the bars $s^2$ $s^4$ forward immediately the pointers $W^6$ have been forced forward by the cams $W^4$, and to allow of the return of the same immediately the nails have been delivered into the receivers T.

When it is desired to supply nails to some of the nail-boxes H' and not to others, the ways $p^2$, leading to the boxes H' it is not desired to use, are closed by their stops S. This stoppage of the ways $p^2$ is effected by placing the pins $s^7$ of the blocks $s'$, in the position shown by dotted lines, and preventing the lateral motion of the bar $s^2$, by turning a cam, X, (fixed loosely on the shaft U) into position to prevent the lateral motion of the bar $s^4$. In this case only those stops S whose blocks $s'$ are connected to the bar $s^2$ will be operated to allow of the passage of a nail to the nail-boxes H', to which they correspond. In this case the cam X may be turned into position by hand, where it will be retained by means of a frictional bearing, X', adapted to embrace a hub on the inner surface of the cam X. The frictional bearing is formed, by preference, of a split rod or lever, $X^2$, bolted to the framing $p$. The pressure of the bearing X' is regulated by a set-screw, $X^3$, passing through the two ends of the split rod or lever $X^2$.

When it is desired to use in regulated order some of the nails supplied from nailways $p^2$, controlled by stops S connected to blocks $s'$, controlled by the rod $s^2$, and some nails supplied from ways $p^2$, controlled by stops S connected to blocks $s'$, controlled by the rod $s^4$, the cam X may be automatically brought into position to stop the end of the rod $s^4$ and release the same by bringing a driver, $w'$, pivoted to an arm, $w^2$, carried by the lever U', into position to engage with one or more of a series of teeth formed on a boss, $X^4$, cast or otherwise formed on the side of the cam X.

In the drawings we have shown the cam X adapted to stop the bar $s^4$ twice and allow it to act freely twice to each revolution of shaft U. This, however, may be varied. If the cam X is extended, it may stop the bar $s^4$ three times and free it once for each revolution of the shaft U; or by removing the cam X and supplying one having two surfaces forming quadrants of a circle arranged opposite to each other, with equal spaces between the said quadrants, the effect will be to operate the bars $s^2$ $s^4$ alternately. Other variations may, however, be readily made by using differently-arranged cams X and timing the parts to correspond.

The receivers T are formed with wide extensions $T^3$ at their upper ends, which are curved outward at $t$, and on their sides facing the feeding apparatus P are formed with an open mouth extending from $t$ to $t'$, and from $t'$ to $t^2$ the extension $T^3$ gradually inclines and decreases in depth to the point $t^3$, where it becomes a simple tube, $t^4$, the lower end of which is received into a tube, T', leading to the funnel $H^*$ of the nail-box H'.

The receivers T are held in position by means of sockets $T^4$, formed on or affixed to a bar, $T^5$, which is held in position with capability of vertical adjustment by means of vertical bars $T^6$, extending down from the under side of the framing $p$, and passing through sockets $t^5$ in the ends of the bar $T^5$.

The receivers T are held in position in their sockets $T^4$ by means of set-screws $t^6$, while the bar $T^5$ is held, when adjusted, by means of set-screws $t^7$.

The object of supporting the receivers T on an adjustable bar, $T^5$, is to allow them to be raised or lowered simultaneously when the machine is adjusted for use with longer or shorter nails, so as to insure their proper reception by the extensions $T^3$.

The driving-shaft B is thrown out of connection with the driving-pulley B' by means of an arm, $d'$, mounted on the axis $d$, which, at the time desired, comes against a conical extension, $C^*$, formed on the side of the cone of the clutch C.

The punches I are formed with heads $i$ and hooked extensions of a similar construction, and applied to the punch-holding frame in a similar manner to that described in our application No. 117,566, before referred to. The length of the heads will be varied, as indicated by dotted and full lines in Figs. 19, 20, 25, so as to make the punches I accord with the punch-cavities in the nail-boxes H'.

Figure 35:
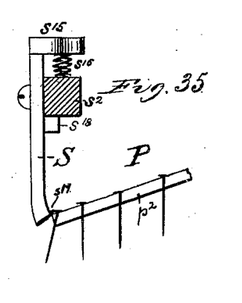
Figure 36:
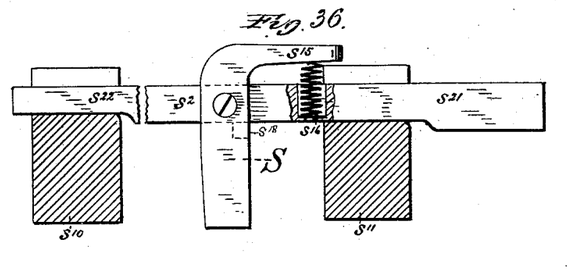

Figs. 35 and 36 show a slight modification of the stop-operating mechanism in which only a single bar, $s^2$, is used, and the stops S are pivoted directly to the bar, instead of to intermediate stops capable of connection at will to either of a pair of operating-bars, as described in the previous figures.

By our improvements great saving is effected in the wear and tear of the machinery, and the danger of breakage of the parts through which the nails have to pass, and also of the parts controlling the passage of the nails, is greatly lessened, if not absolutely avoided.

By adjusting the position of the arm $W^*$ on the shaft U a variation of stroke may be imparted to the levers $W^{12}$ $W^{15}$, so as to give a greater or less rise and fall to the nail-feeding mechanism P, for the purpose of accommodating the angle of the nailways of the said mechanism P, according to the facility or otherwise with which nails for the time being used will flow through the said nailways.

The operation of the main parts of this machine is similar to that of the machine shown and described in the application for Letters Patent of the United States filed by us on or about the 14th day of January, 1884, Serial No. 117,556, hereinbefore referred to, and does not require special description in this specification.

Having thus described our invention, what we claim, and desire to secure by Letters Patent, is—

1. In a box-nailing machine, substantially as described, a nail-supply pan, as O, arranged in rear of the nail-feeding device P, and having pivots $o$, supported in open journals $p'$, the said pivots being arranged to rise freely when the nail-feeding device becomes clogged, as herein set forth.

2. A nail-supply pan having plates in its bottom forming nailways, and being pivoted at the rear of the nail-feeding mechanism, and having the plates forming its nailways extended beyond the pan to overlap the plates forming the nailways of the nail-feeding mechanism when the front end of the said supply-pan is raised, substantially as shown and described.

3. The combination, with a nail-feeding mechanism provided with plates forming nailways, of a nail-supply pan, also having plates in its bottom forming nailways, the said supply-pan being pivoted in the automatic vertically-adjustable bearings at the rear of the nail-feeding mechanism, substantially as and for the purpose described.

4. The combination, with a pivoted nail-supply pan provided with plates in its bottom forming ways for the reception and guidance of nails, of a pivoted bar arranged at the front of the nail-supply pan and adapted to clear the ways of the said pan, substantially as and for the purpose described.

5. The combination, in a nail-feeding mechanism, of a frame or support provided with a series of way-plates with a second frame or support, also provided with a series of way-plates, the way-plates of the said frames or supports being arranged to act in pairs to form nailways, one series being adjustable in relation to the other laterally, substantially as and for the purpose set forth.

6. The combination, with the nail-feeding mechanism, of a pair of way-plate supporting frames adjustable laterally one in relation to the other, and the frame-adjusting screws, substantially as shown and described.

7. In a box-nailing machine, the combination, with the nail-feeding device P, having nailways $p^2$, of a sliding bar operating in planes at right angles to each other, and a series of tilting nailway-stops supported on said bar and arranged to operate as and for the purposes set forth.

8. The combination, with the nailways of a nail-feeding mechanism and a pair or series of nailway-stop-operating bars capable of independent or collective action, of a series of nailway-stop-supporting blocks or carriers capable of interchangeable attachment, by means substantially as described, to one or other of the pair or series of nailway-stop-operating bars, substantially as shown and described.

9. The combination, with the nailways of a nail-feeding mechanism, of a pair or series of nailway-stop-supporting bars operated horizontally and vertically by means substantially as described, and a series of pivoted and tilting nailway-stops provided with hooks at their lower ends and capable of attachment to either of the said stop-supporting bars in any desired order, substantially as and for the purpose described.

10. The combination, with the nailways of a nail-feeding mechanism, of a pair or series of nailway-stop-supporting bars operated horizontally and vertically and connected or disconnected one with the other by means substantially as described, of a series of nailway-stop-supporting blocks or carriers capable of interchangeable attachment to one or other of the pair or series of nailway-stop-operating bars, and a series of pivoted and tilting nailway-stops provided with hooks at their lower ends and carried by the said nailway-stop-supporting blocks or carriers, substantially as shown and described.

11. The combination, with the nailways of a nail-feeding mechanism of a nailway-stop-supporting bar or bars, of a cam or cams for effecting the lateral motion of the said bar or bars, substantially as shown and described.

12. The combination, with the nailways of a nail-feeding mechanism and a pair or series of nailway-stop-supporting bars, of a cam or cams for effecting the lateral motion of the said bars, and a cam or stop adapted, by means substantially as described, to prevent the lateral motion of one or more of the said bars in order to close any desired number of the nailways, substantially as shown and described.

13. In a box-nailing machine, the combination, with a nailway of a box-nail-feeding mechanism, of a pivoted stop, S, formed with a hook, $s^{20}$, at its lower end, a stop, $s^{18}$, and retaining-spring $s^{16}$, substantially as and for the purpose described.

14. In a box-nailing machine, the combination, with a pair of nailway-stop-supporting bars, of a series of stop-holding blocks and nailway-stops, and a series of removable pins or screws adapted to engage by change of position any or all of the series of stop-holding blocks with either of the said supporting-bars, substantially as and for the purpose described.

15. In a box-nailing machine, the combination, with a series of nail-guiding ways and a series of nailway-stops controlled in position by a bar or bars, of a series of pointers, a series of pointer-operating cams mounted on a common shaft, and a bar-operating cam mounted on the pointer-operating cam-shaft, adapted to operate the stop-operating bar or bars at times in accordance with the action of the pointer-operating cams and pointers, so as to insure the correct delivery of the individual nails, substantially as shown and described.

16. In a box-nailing machine, the combination, with the bars $s^3$ $s^4$, of the springs $s^{12}$ $s^{13}$ and cams $U^5$ and X, arranged and adapted to operate substantially as shown and described.

17. The combination, with the hollow nail-receivers T, having open mouths arranged in the direction of the nail-feeding device P, of the vertical bars $T^6$, the bar $T^5$, having sockets $t^5$, and set-screws $t^7$, as and for the purposes set forth.

18. The combination, with the nail feeding and delivering mechanism, of a nail-receiver, T, formed with an extension, T³, and an open mouth, $t\ t'\ t'\ t^2$, substantially as and for the purpose described.

19. The combination, with the nail-box of a box-nailing machine, of a spring-clamp formed in sections, each section composed of independent plates pivoted on a common axis at their upper ends and formed with internal surfaces, substantially as shown and described, so arranged that one plate or set of plates of each section shall first act alone on the shank, and subsequently in conjunction with the remaining plates of each section on the head of the nail being clamped and driven into position, substantially as shown and described.

20. In a box-nailing machine, the combination, with a nail-box, of a clamp, H⁶, formed of sections constructed of a series of pivoted plates, as described, and of a double pair or series of springs adapted to operate on the sectional plates of the clamp in succession, substantially as and for the purpose described.

21. The combination, with the nailways of the nail-feeding mechanism, of the pointers W⁶ and the adjustable pointer-holding means Z, and nailway-stops S, substantially as and for the purpose described.

22. In combination with a nail-feeding mechanism reciprocated vertically at intervals by a series of levers, substantially as described, of a pivoted nail-supply pan, O, a chain-wheel, as $q^4$, and connections, as shown, for reciprocating said pan vertically simultaneously with the nail-feeding mechanism, and also independently thereof, substantially as shown and described.

23. The nail-feeding mechanism P, supported as described, in combination with a series of levers operated by a crank-arm, W*, carried by a rock-shaft, U, supported by the cross-head and reciprocated with the same, and a pivoted double lever, W¹², supported and rocking the outer end of the feeding mechanism, as and for the purpose described.

24. In a box-nailing machine, as described, the combination, with the nail-feeder pan O, having a series of channels, $o^2$, arranged to deposit nails into the ways $p^2$ of the nail-feeding device, of the independent angular or curved extensions $o^6$, arranged with their points centrally between two adjacent channels, as and for the purposes set forth.

In witness whereof we have hereunto set our hands this 22d day of July, 1884.

THOMAS L. SMITH.
WILLIAM S. DOIG.

Witnesses:
D. B. TREADWELL,
W. COLBORNE BROOKES.